(12) United States Patent
Byrd et al.

(10) Patent No.: US 9,690,485 B2
(45) Date of Patent: Jun. 27, 2017

(54) ADJUSTMENT OF VOLUME SYNCHRONIZATION

(71) Applicant: International Business Machines Corporation, Armonk, NY (US)

(72) Inventors: Stephen A. Byrd, Campbell, CA (US); Scott J. Colbeck, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/255,478

(22) Filed: Sep. 2, 2016

(65) Prior Publication Data

US 2017/0046072 A1   Feb. 16, 2017

Related U.S. Application Data

(63) Continuation of application No. 14/823,365, filed on Aug. 11, 2015.

(51) Int. Cl.
*G06F 12/00*   (2006.01)
*G06F 3/06*   (2006.01)

(52) U.S. Cl.
CPC .......... *G06F 3/0605* (2013.01); *G06F 3/065* (2013.01); *G06F 3/067* (2013.01); *G06F 3/0617* (2013.01); *G06F 3/0634* (2013.01); *G06F 3/0644* (2013.01)

(58) Field of Classification Search
CPC ....... G06F 3/0619; G06F 3/065; G06F 3/0668
See application file for complete search history.

(56) References Cited

U.S. PATENT DOCUMENTS

| | | |
|---|---|---|
| 8,775,549 B1 | 7/2014 | Taylor |
| 9,329,801 B1 | 5/2016 | Byrd et al. |
| 9,411,541 B1 | 8/2016 | Byrd et al. |
| 2006/0095696 A1 | 5/2006 | Amano et al. |
| 2014/0324774 A1 | 10/2014 | Chen et al. |
| 2015/0278331 A1 | 10/2015 | Blea et al. |

OTHER PUBLICATIONS

Byrd et al., "Adjustment of Volume Synchronization"; U.S. Appl. No. 14/823,365, filed Aug. 11, 2015.
List of IBM Patents or Patent Applications Treated As Related; Dated Jan. 16, 2017; 2 pages.

*Primary Examiner* — Gurtej Bansal
(74) *Attorney, Agent, or Firm* — A. Imtiaz Billah (57) ABSTRACT

Embodiments of the present invention provide systems and methods for adjusting synchronization rates of volumes. Volumes and their copies (i.e., mirrored volumes) provide physical or virtual storage on a data storage medium. Depending on the function (i.e., the purpose) of mirrored volumes, a certain synchronization rate is recommended. Embodiments of the present invention provide systems and methods for an automatic dynamic adjustment of individual synchronization rates by adapting to changes in system workloads in order to avoid degradation of user-driven input/output (IO) and to efficiently achieve nearly 100% synchronization for all mirrored volumes.

1 Claim, 4 Drawing Sheets

ADJUSTMENT OF VOLUME SYNCHRONIZATION

BACKGROUND OF THE INVENTION

The present invention relates generally to the field of information technology management and more specifically to management of volume for data storage.

A volume is a fixed amount of physical or virtual storage on a data storage medium. Mirrored volumes have two such copies, where a volume copy is a physical copy of the data which is stored on a volume. Conversely, non-mirrored volumes have one copy. When creating a volume copy, most storage devices possess measures to control synchronization rates of the two volume copies.

SUMMARY

A computer system for adjusting synchronization rates, the computer system comprises: one or more computer processors; one or more non-transitory computer readable storage media; program instructions stored on the one or more non-transitory computer readable storage media for execution by at least one of the one or more processors, the program instructions comprising: program instructions to configure a set of mirrored volumes based on a set of binary property values and associated priorities, at any given time prior to and after an adjustment of the synchronization rates; program instructions to copy one or more volumes to result in one or more mirrored volumes, wherein the synchronization rates are adjusted at the same time; program instructions to evaluate a system performance at a device level, a storage pool level, and a volume level wherein a collected baseline performance is compared to a collected system performance associated with a later point in time; program instructions to adjust synchronization rates of the one or more mirrored volumes based on impending input/output (TO) changes by retrieving a historic system performance level at the device level, the storage pool level, and the volume level, wherein searches for non-permanent mirror volumes and permanent mirror volumes lead to the decrease of the synchronization rates of low priority, non-permanent mirror volumes and the increase of the synchronization rates of high priority, permanent mirror volumes; program instructions to re-evaluate a new system performance, in response to adjusting the synchronization rates of the one or more mirrored volumes, by comparing the new collected system performance associated with the later point in time, and determining a current workload after adjusting the synchronization rates of the one or more mirrored volumes; and program instructions to re-adjust the synchronization rates of the one or more mirrored volumes wherein, a decrease in a new system performance in comparison to the collected baseline performance leads to an increase in the synchronization rates of the one or more mirrored volumes, and an increase in the new system performance in comparison to the collected baseline performance leads to a search for available mirrored volumes.

DETAILED DESCRIPTION

A volume controller helps a user to monitor, manage, and configure a system through a graphical user interface. Storage devices provide the means to control the rate at which synchronization occurs (e.g., SAN Volume Controller for a vdisk mirror) when creating a volume copy by configuring by definition a "purpose" of the volume copy. Depending on the purpose of a volume copy (i.e., volume mirror), a certain synchronization rate is recommended. Increasing the synchronization rate means that the new volume mirror is synchronized compared to the original at the faster rate at the expense of additional demand on the storage device's capabilities. Thus, storage administrators typically use a default synchronization rate for all mirrors and can run a limited number of volume migrations at any given time. Embodiments of the present invention provide systems and methods for an automatic dynamic adjustment of individual synchronization rates by adapting to changes in system workloads in order to avoid degradation of user-driven input/output (IO) and to efficiently achieve nearly 100% synchronization for all mirrored volumes.

Figure 1:
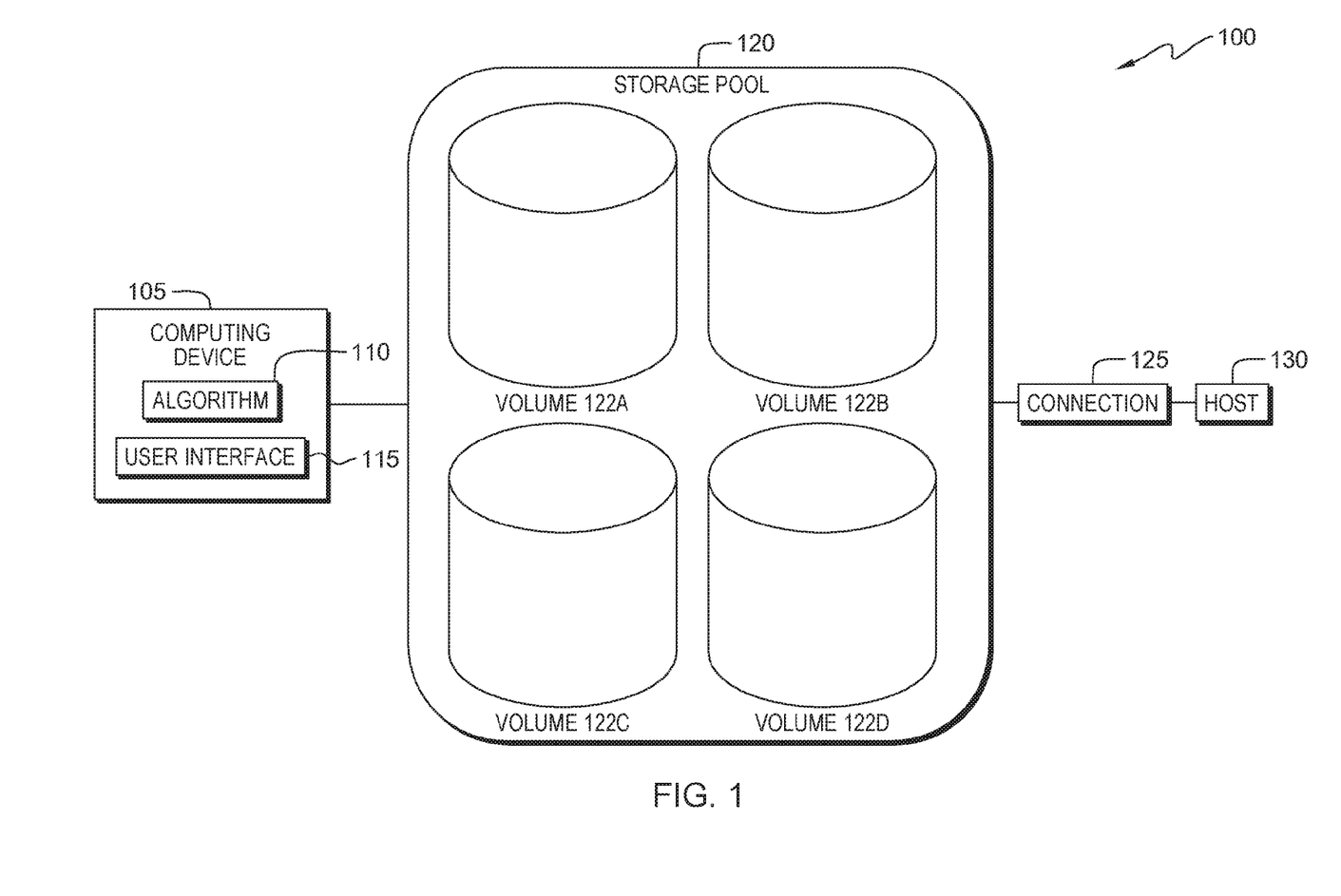
FIG. 1 is a functional block diagram illustrating a data processing environment, in accordance with an embodiment of the present invention.

The present invention will now be described in detail with reference to the Figures. FIG. 1 is a functional block diagram illustrating a data processing environment, generally designated 100, in accordance with one embodiment of the present invention. FIG. 1 provides only an illustration of implementation and does not imply any limitations with regard to the environments in which different embodiments may be implemented. Modifications to data processing environment 100 may be made by those skilled in the art without departing from the scope of the invention as recited by the claims. In this exemplary embodiment, data processing environment 100 includes computing device 105, storage pool 120, connection 125, and host 130.

Computing device 105 includes algorithm 110 and user interface (UI) 115. Computing device 105 may be a laptop computer, a tablet computer, a netbook computer, a personal computer (PC), a desktop computer, a personal digital assistant (PDA), a smart phone, a thin client, or any programmable electronic device capable of communicating with host 130. Computing device 105 may include internal and external hardware components, as depicted and described in further detail with respect to FIG. 4.

Algorithm 110 works in conjunction with a volume controller (not depicted) (e.g., SAN Volume Controller) to combine software and hardware into a comprehensive and modular appliance that uses symmetric virtualization.

UI 115 may be for example, a graphical user interface (GUI) or a web user interface (WUI) and can display text, documents, web browser windows, user options, application interfaces, instructions for operation, and includes the information (such as graphic, text, and sound) a program presents to a user and the control sequences the user employs to control the program. UI 115 is capable of receiving data, user commands, and data input modifications from a user. UI 115 is also capable of communicating with algorithm 110. In some embodiments, UI 115 may be integrated with algorithm 110.

Storage pool 120 is a storage collection which identifies an underlying set of resources. These resources provide the capacity and management requirements for a volume or set of volumes where a volume is a fixed amount of physical or virtual storage on a data storage medium. Access to volumes 122A-122D consists of input/output (IO) groups that allows hosts (e.g., host 130) to access a volume. In other embodiments, a variable number of volumes may exist. This setup can optionally include the caching of an IO group volume copy. Pertaining to a device for a process, channel, or communication path, IO involves data input, data output, or both. A volume copy is a physical copy of the data that is stored on a volume where mirrored volumes have two such copies and non-mirrored volumes have one such copy. A managed disk (Mdisks) is a logical unit of physical storage which are RAID arrays from internal storage or volumes from external storage systems. An array is an ordered collection or group of physical devices (e.g., drives) which provides storage for virtual volumes (i.e., emulated volumes which function in the form as a typical volume). MDisks are not visible to host systems. If a volume which is dependent on a particular MDisk is unavailable, the mirrored volume copy can be added to a selected volume in order to circumvent the unavailability of the required MDisk. A configuration node acts as the focal point for configuration commands and manages the data described in a clustered-system configuration.

Connection 125 connects storage pool 120 with host 130. In one embodiment, connection 125 can include a dedicated storage network tailored to a specific environment by combining servers, systems, storage products, networking products, software, and services. In another embodiment, connection 125 can include a storage area network (SAN) configured into a number of zones and is a pool of storage systems that are interconnected to the servers in an enterprise where a SAN administrator is the person responsible for administering the various resources that make up the SAN. The SAN fabric is an area of the network that contains routers and switches that connect the components (such as hosts) of a local clustered system. A device using the SAN can communicate only with devices that are included in the same zones which it is located in. A system requires several distinct types of zones: a system zone, host zones, and disk zones. An intersystem zone is optional. An access point is a part of a fabric which connects to a storage pool 120. In this exemplary embodiment, connection 125 utilizes a fiber channel in order to transmit data between computer devices. In a preferred embodiment, computer servers are attached to shared storage devices. In some embodiments, storage controllers and drives are interconnected.

Host 130 is linked to storage pool 120 via connection 125. A host is a computer which connects to a network and provides an access point to the network. The host can be a client, an application server, or both a client and server simultaneously. Clients are software programs or computers which request services from a server. An application server is a host which is attached to the storage area network (SAN) and runs applications. An input/output (IO) group (not pictured) is a collection of volumes and node relationships that present a common interface to host systems. In this exemplary embodiment, a node is a single processing unit within a system, and a pair of nodes makes up an IO group. A numeric identifier is assigned to a group of host ports for the purpose of logical unit number (LUN) mapping. Host mapping is the process of controlling which hosts have access to specific volumes within a clustered system. For each host ID, there is a separate mapping of Small Computer System Interface (SCSI) IDs to volumes. An interface card is an optional portion of a node which provides a system with additional host and storage connectivity options.

In this exemplary embodiment, algorithm 110 controls synchronization (sync) rates of a volume replication in which an application writing operation is carried out on both the source volume and target volume before control is given back to the application. Workloads of a system may vary with time and algorithm 110 aims to adjust sync rates by automatic dynamic adjustment of individual sync rates. A volume controller is a separate component that work with algorithm 110. A volume controller handles massive amounts of data from various social and mobile applications, enables rapid and flexible cloud service deployments, and ensures high level performance and stability. Thus, a volume and its volume mirror copy must be "in sync" with each other and work "identically" with respect to one another. If sync rates are too high, additional demand on storage devices is imposed which lessens the performance of other functionalities. For example, a group of application servers help run a website for a catering business. Application servers access volumes. If the sync rate between the original volume and its volume mirror copy is too high, the website may not perform smoothly and exhibits shoddy performance (e.g., not be able to process consumer requests). If the sync rate between the original volume and its volume mirror copy is too low, the system is not doing enough work. Due to an undesirable low sync rate, a website may not run smoothly leading to a different deleterious consequence (e.g., a loss of data). Algorithm 110 employs existing mirrored volume relationships configured with priority and purpose and evaluates current system performance at device, pool, and volume levels. Optionally, algorithm 110 has a set of desired additional mirrored relationships with priority and purpose and historic system performance at the device, pool, and volume levels.

Figure 2:
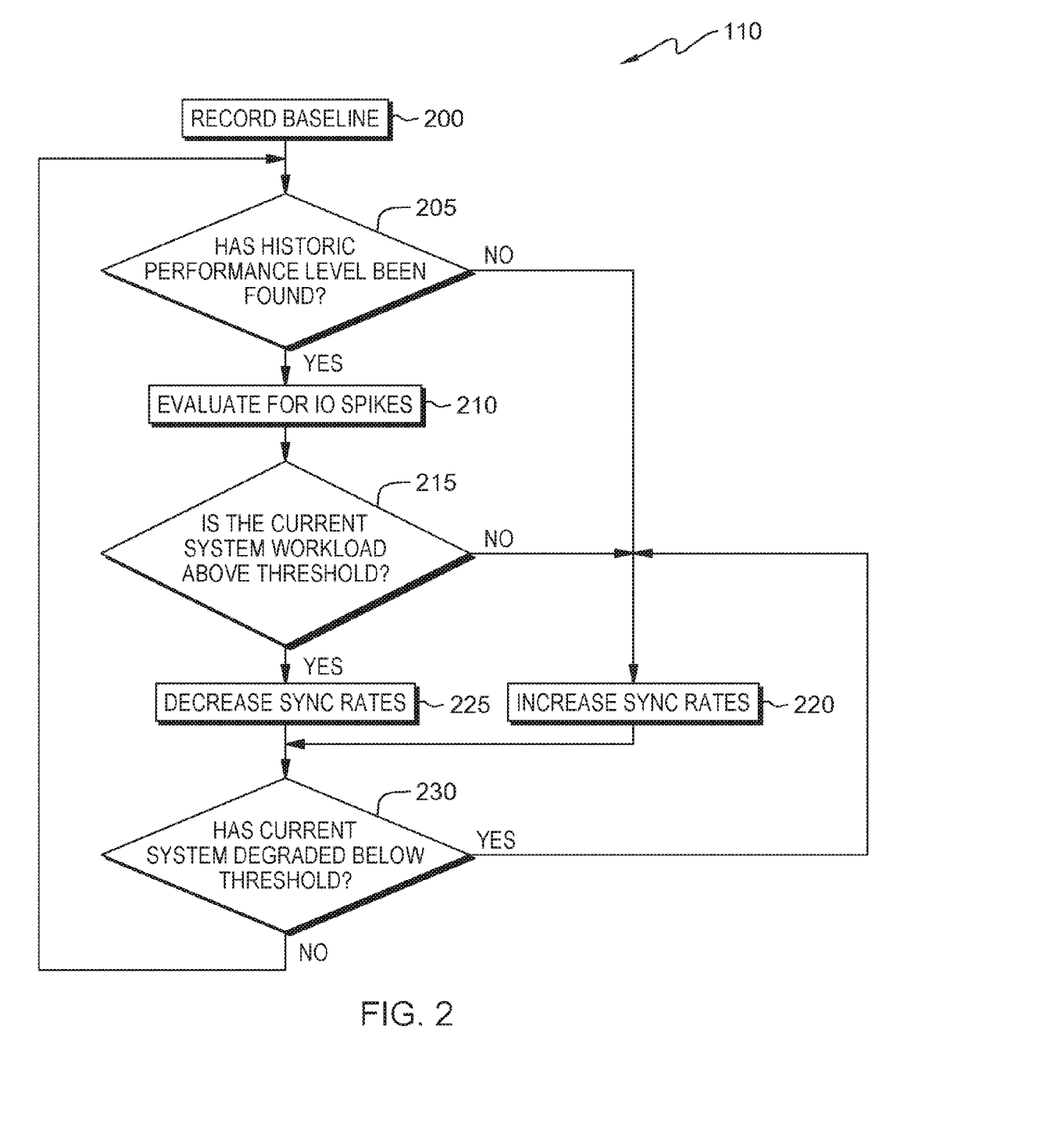
FIG. 2 is a flowchart depicting operational steps for adjusting synchronization rates, in accordance with an embodiment of the present invention.

FIG. 2 is a functional block diagram depicting operational steps for adjusting synchronization rates based on workloads, in accordance with an embodiment of the present invention.

In step 200, algorithm 110 records a baseline. A baseline is set by recording the current system load at the system, storage pool, and storage volume levels. Algorithm 110 receives the priority and purpose of the existing mirrored volumes and groups them according to priority and purpose. An example of grouping by priority is configuring two volumes, where one volume associated with website data is grouped as more important than another volume associated with e-mail data. An example of grouping by purpose is configuring two volumes in two different locations, where one volume is used as the primary server and the other volume is used as a fail-over server. Additional purpose values beyond "permanent" and "temporary" can be added, as long as algorithm 110 is updated and able to place and process the new pairings. Mirror relationships (e.g., metro mirrors and global metro mirrors) are the association between a master volume and an auxiliary volume. These volumes also have the attributes of a primary or secondary volume. Metro mirror relationship is a method of synchronous replication that maintains data consistency across multiple volumes within the system and is generally used to write latency caused by the distance between the source site and target site which is acceptable to application performance. Global metro mirror is a method of an asynchronous replication that maintains data consistency across multiple volumes within or across multiple systems, and is generally used where distances between the source site and target site cause increased latency beyond the capability that the application can accept. Latency is the time between a task initiating data transfer and the time that transfer is recognized as complete at the data destination. A primary volume in a stand-alone metro mirror or global mirror relationship is the target of writing operations issued by the host application. A secondary volume in a metro mirror or global mirror relationship is a copy of data written by the host application to the primary volume. If a set of desired additional mirrored relationships with priority and purpose exist, the more important volumes (based on priority and purpose pair) are accessed. In one exemplary embodiment, these steps will change sync rates for a single mirrored relationship at a single time. In another exemplary embodiment, these steps will change sync rates for multiple mirrored relationships at a single time.

In step 205, algorithm 110 determines if a historic performance level has been found. In this exemplary embodiment, the historical performance level of the system is described at the device, storage pool, and volume levels. Historical performance levels may be stored in a repository of data which can be accessed by algorithm 110. If the baseline needs to be recalculated, algorithm 110 goes back to step 200 and records a new baseline.

If, in step 205, the historic performance level has been found then in step 210, algorithm 110 evaluates the system for IO spikes. In this exemplary embodiment, historic system performance at the device, storage pool, and volume levels are analyzed to look for IO spikes. IO spikes involve greater data input and/or data output activity, which potentially imposes constraints on the system in use. Impending IO spikes are predicted for the next hour and the next twenty-four hours. If an impending IO spike is anticipated for the next hour, algorithm 110 compares the current system load with prior current system workloads. The evaluation for IO spikes carried out by algorithm 110 determines if current workload is low enough to allow for a future IO spike. In some embodiments, checks for impending IO spikes can be turned off (rendering sync rate decreases carried out in step 225 as entirely due to comparisons with the baseline) and thus algorithm 110 skips this step and goes directly to step 215.

In step 215, algorithm 110 determines if the current system workload is above a threshold after evaluating for IO spikes. In this exemplary embodiment, algorithm 110 compares the performance of the system and the current workload of the system to determine if the workload is above a threshold.

If, in step 215, algorithm 110 determines that the current system workload is not above the threshold, then, in step 220, algorithm 110 increases the sync rates. Only currently active synchronizations begin increasing sync rates. A max sync rate can be reconfigured (as opposed to the preconfigured max sync rate on a device). In this exemplary embodiment, an anticipated spike in workload is not predicted and thus algorithm 110 begins increasing sync rates of the currently active synchronizations. Initially, the most important mirrored volume group (based on priority and purpose) begins increasing the sync rate for individual mirror relationships. After each sync rate increase, algorithm 110 waits for a period of time in order to collect new performance data. In instances where the system workload is not too high, the system has the ability to increase sync rates without compromising the other capabilities of the system.

If, in step 215, algorithm 110 determines that the current system workload is above a threshold, then, in step 225, algorithm 110 decreases the sync rates. In this exemplary embodiment, algorithm 110 begins to decrease sync rates of currently active synchronizations until the current system workload is alleviated. The process and decision logic by which mirror synchronizations operate is described in more detail with respect to FIG. 3.

In step 230, algorithm 110 determines if the current system has degraded below the threshold. Algorithm 110 either increases sync rates or decrease sync rates. In this exemplary embodiment, algorithm 110 waits for a predetermined time based on system requirements in order to collect new performance data after an increase in sync rates or a decrease in sync rates. Upon evaluation of the current system performance data against a baseline after sync rates changes (i.e., decreases or increases), algorithm 110 normalizes the baselines based on IO differences. If the current system performance has degraded substantially (i.e., below a preconfigured measurable percentage) at any monitored level (e.g., device, storage pools, and volumes level), algorithm 110 reverts back to increasing sync rates in step 220.

If, in step 230, the current system performance has not degraded substantially (as a measurable configurable percentage) at any monitored level (e.g., devices, storage pools, and volumes level), then, in step 205, algorithm 110 resumes the operational steps for adjusting synchronization rates by finding historic performance levels and re-performing the operations starting with step 205. Algorithm 110 may be configured such that the user can permit allowable performance deviation from baseline performance, which is still deemed to have not degraded substantially. Metrics used by algorithm 110 to record and evaluate the new system performance in comparison to the baseline can be reconfigured. In exemplary embodiments where sync rates are described for multiple mirrored relationships at a time, larger scale changes would result in the system workload and potentially faster transition from the current state to a stable state as opposed to exemplary embodiments where sync rates are described for a single mirrored relationship at a single time. The faster transition to a stable state is achieved at the expense of granular evaluation and control of the system due to adjusting multiple mirrored relationships at a time.

If in step 205, the historic performance level is not found, then in step 220, algorithm 110 increases the sync rates. After each sync rate increase, algorithm 110 waits for a period of time in order to collect new performance data. In instances where the system workload is not too high, the system has the ability to increase sync rates without compromising the other capabilities of the system.

Figure 3:
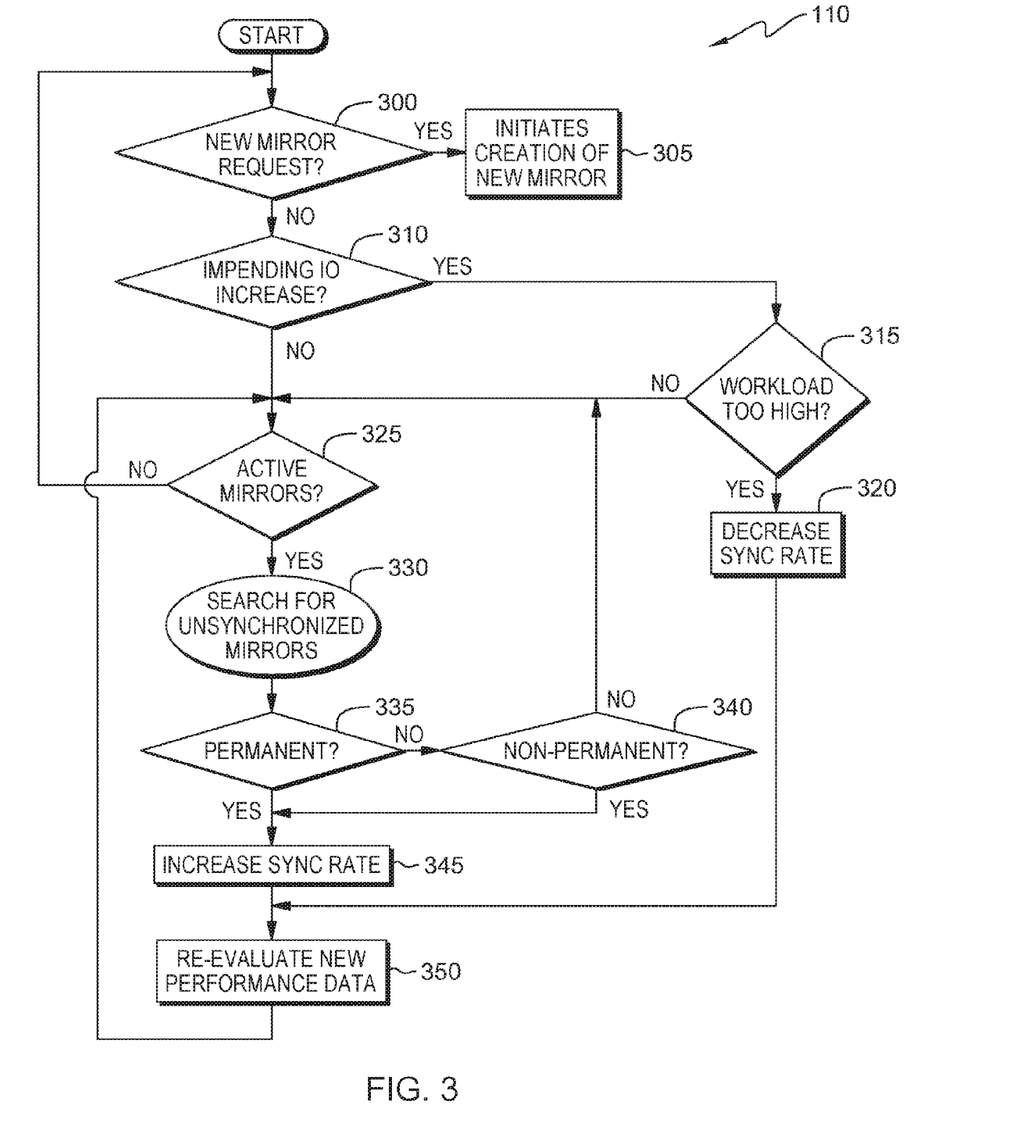
FIG. 3 is a flowchart depicting operational steps for using volume mirrors to synchronization rates, in accordance with an embodiment of the present invention.

FIG. 3 is a flowchart depicting operational steps for adjusting synchronization rates using volume mirrors, in accordance with an embodiment of the present invention.

In step 300, algorithm 110 determines if there is a new mirror volume request. A new mirror volume request is a means for adding system capability by introducing a new volume or volumes. New volumes may improve availability of volumes by protecting volumes from a single storage system failure; provide concurrent maintenance of a storage system that does not natively support concurrent maintenance; convert between fully allocated volumes and thin-provisioned volumes; and provide an alternative method of data migration. While a volume is being migrated from the source pool (i.e., the originating pool) to the target pool (i.e., end pool after migration), it is vulnerable to failures on both the source pool and the target pool. Volume mirroring provides an alternative method by starting with a non-mirrored volume in the source pool and then adding a copy to that volume in the target pool. When the volume is synchronized, the original copy can be deleted in the source pool. During the synchronization process, the volume remains available even if there is a problem with the destination pool.

If, in step 300, there is a new mirror request, then, in step 305, algorithm 110 initiates the creation of a new mirror volume, which the system can utilize to meet IO increases and anticipated workloads if there is a new mirror volume request. In this exemplary embodiment, a volume mirror is created with an initial sync rate of the storage device minimum (typically zero). Creation of volume mirrors continues until there are no additional mirrored relationships (or remaining requests are impossible due to system constraints, such as capacity).

If, in step 300, there is not any new mirror request, then, in step 310, algorithm 110 determines if there is an impending IO increase. Requested additional mirrored relationships can be removed and an initial sync rate for mirrors created in step 305 can be changed from the device's default minimum value to another value. The determination of an impending IO spike is based upon historic performance levels and baseline data as described in FIG. 2 with respect to steps 205 and 210.

If, in step 310, algorithm 110 determines there is not an impending IO increase, then, in step 325, algorithm 110 determines if there are active mirror volumes. If, In step 325, algorithm 110 determines there are not any active mirror volumes, then, algorithm 110 reverts back to step 300 in order to determine if there is a new mirror request.

If, in step 310, algorithm 110 determines there is an impending IO increase, then, in step 315, algorithm 110 determines if the work load of the system is too high, as described in FIG. 2 with respect to step 215.

If, in step 315, algorithm 110 determines the workload of the system is not too high, then, in step 325, algorithm 110 determines if there are active mirror volumes.

If, in step 315, algorithm 110 determines the work load is too high, then, in step 320, algorithm 110 decreases the sync rate (similarly to the process which is described in step 225 with respect to FIG. 2). The sync rates of currently active synchronizations are initially decreased. Permanent mirrors are typically used for redundancy purposes. Permanent mirrors exist for the life of the primary volume as a backup in case the primary volume fails. Non-permanent mirrors exist in order to migrate the primary volume from one storage pool to another. Once the migration completes, the non-permanent mirror will be removed. Algorithm 110 initially acts on the lowest priority non-permanent mirrors and ends with highest priority permanent mirrors. For example, two mirrors A and B are permanent and non-permanent, respectively. The permanent mirror, A, has been configured to be of highest priority and the non-permanent mirror, B, has been configured to be lowest priority. Algorithm 110 may initially lower the sync rate of B and then act upon A, until the current work load is sufficiently decreased.

In step 350, algorithm 110 re-evaluates the new performance data of the system upon algorithm 110 decreasing sync rates in step 320 or increasing sync rates in step 345. The new performance data and current workload are compared to a pre-recorded baseline. The re-evaluation is described in more detail with respect to step 230 in FIG. 2. The decision logic of algorithm 110 reverts back to step 325 either directly or indirectly depending on the re-evaluation of the new performance data. Instances where the system performance is at acceptable levels and limited-to-no system performance degradation has occurred, algorithm 110 reverts directly to step 325 in order for algorithm 110 to determine if there are any active mirror volumes. Instances where the system performance where the system performance is not at acceptable levels and discernible system performance degradation has occurred, algorithm 110 reverts indirectly to step 325 via a detour step which increases sync rates.

If, in step 325, algorithm 110 determines there are active mirror volumes, then, in step 330, algorithm 110 searches for unsynchronized mirror volumes. In this exemplary embodiment, permanent mirror volumes are treated as more important than non-permanent mirror volumes. However, reconfiguration may cause algorithm 110 to treat non-permanent mirror volumes as more important than permanent mirror volumes. In this exemplary embodiment, algorithm 110 treats permanent mirrors as more important than non-permanent mirrors and thus initially searches for permanent mirrors.

In step 335, algorithm 110 determines whether the unsynchronized mirror is permanent. If, in step 335, algorithm 110 determines that the unsynchronized mirror is permanent, then, in step 345, algorithm 110 increases the sync rate (described in further detail below).

If, in step 335, algorithm 110 determines that the unsynchronized mirror volumes are not permanent, then in step 340, algorithm 110 determines whether the synchronized mirror volumes are non-permanent.

If, in step 340, algorithm 110 determines that the unsynchronized mirror volume is not non-permanent, then algorithm 110 reverts back to step 325 in order to determine if there are active mirror volumes.

If, in step 340, algorithm 110 determines the unsynchronized mirror volume is non-permanent, then, in step 345, algorithm 110 increases the sync rate.

In step 345, algorithm 110 increases the sync rates of the mirrored volumes upon determining the unsynchronized mirror is permanent in step 335 or the unsynchronized mirrors is non-permanent in step 340. In this exemplary embodiment, the highest priority mirrored volume group is acted upon first by increasing the sync rate for individual relationships. If a mirrored relationship is permanent, algorithm 110 initially acts on mirrors which have the lowest current synchronization. Algorithm 110 precludes the individual sync rate of a mirror from deviating too significantly from the overall average within a group. In instances of non-permanent mirrors, algorithm 110 acts by initially increasing non-permanent mirrors with the highest current synchronization in order to complete their use quickly by maximizing sync rates. Furthermore, instances of completely unsynchronized non-permanent mirrors are grouped into subsets by algorithm 110 and sync rates are increased on a per-subset basis. The purpose value can be dropped and not considered by algorithm 110. Thus, algorithm 110 selects which mirrored volume to initially increase based on priority. Similarly, the priority value can be dropped and not considered by algorithm 110. Thus, algorithm 110 selects which mirrored volume to initially increase based on purpose.

Figure 4:
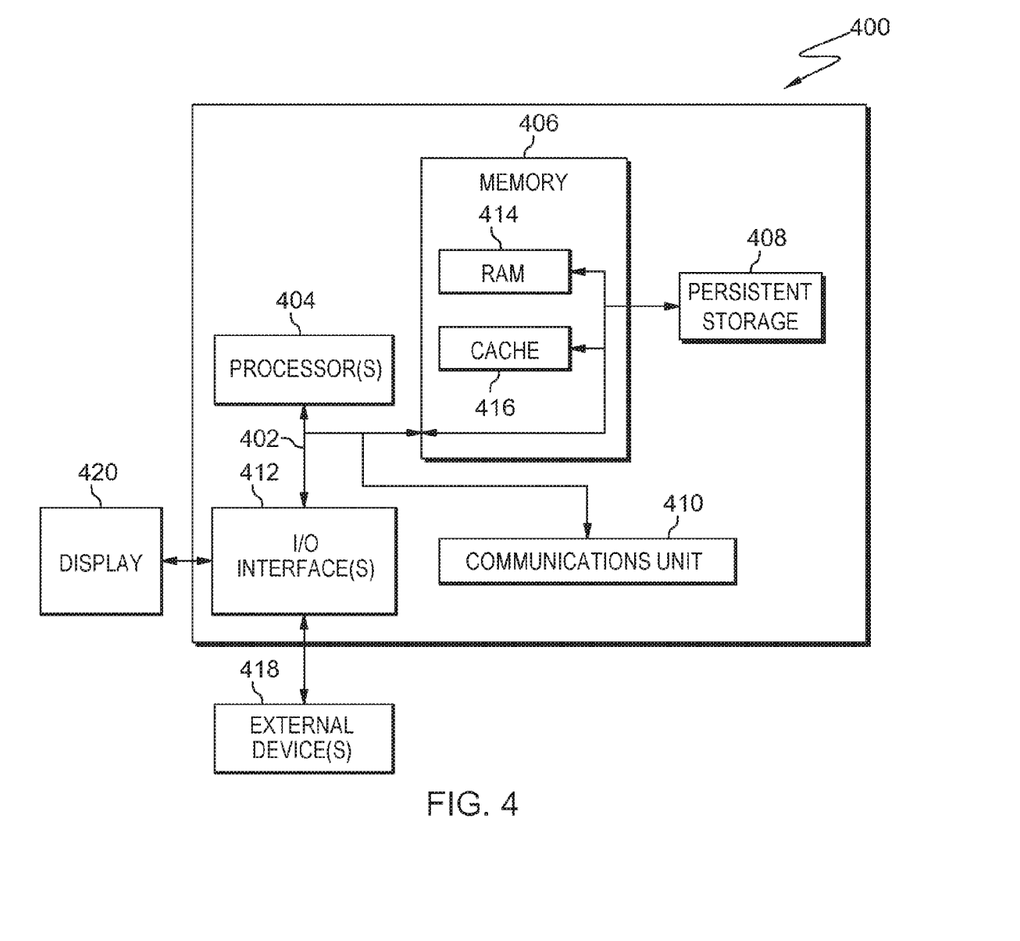
FIG. 4 depicts a block diagram of internal and external components of a computing device, in accordance with an embodiment of the present invention.

FIG. 4 depicts a block diagram of components of device 400 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Device 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media.

Program instructions and data used to practice embodiments of the present invention may be stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of connection 125. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to device 400. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, (e.g., software and data) can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience and thus, the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer system for adjusting synchronization rates, the computer system comprises:
   one or more computer processors;
   one or more non-transitory computer readable storage media;
   program instructions stored on the one or more non-transitory computer readable storage media for execution by at least one of the one or more processors, the program instructions comprising:
   program instructions to configure a set of mirrored volumes based on a set of binary property values and associated priorities, at any given time prior to and after an adjustment of the synchronization rates;
   program instructions to copy one or more volumes to result in one or more mirrored volumes, wherein the synchronization rates are adjusted at the same time;
   program instructions to evaluate a system performance at a device level, a storage pool level, and a volume level wherein a collected baseline performance is compared to a collected system performance associated with a later point in time;
   program instructions to adjust synchronization rates of the one or more mirrored volumes based on impending input/output (IO) changes by retrieving a historic system performance level at the device level, the storage pool level, and the volume level, wherein searches for non-permanent mirror volumes and permanent mirror volumes lead to the decrease of the synchronization rates of low priority, non-permanent mirror volumes and the increase of the synchronization rates of high priority, permanent mirror volumes;
   program instructions to re-evaluate a new system performance, in response to adjusting the synchronization rates of the one or more mirrored volumes, by comparing the new collected system performance associated with the later point in time, and determining a current workload after adjusting the synchronization rates of the one or more mirrored volumes; and
   program instructions to re-adjust the synchronization rates of the one or more mirrored volumes wherein, a decrease in a new system performance in comparison to the collected baseline performance leads to an increase in the synchronization rates of the one or more mirrored volumes, and an increase in the new system performance in comparison to the collected baseline performance leads to a search for available mirrored volumes.

* * * * *